(12) United States Patent
Prasad et al.

(10) Patent No.: US 11,783,306 B1
(45) Date of Patent: *Oct. 10, 2023

(54) SYSTEMS AND METHODS FOR MOBILE DEPOSIT OF NEGOTIABLE INSTRUMENTS

(71) Applicant: United Services Automobile Association (USAA), San Antonio, TX (US)

(72) Inventors: Bharat Prasad, San Antonio, TX (US); Michael Frank Morris, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,849

(22) Filed: Jan. 5, 2022

Related U.S. Application Data

(63) Continuation of application No. 17/069,219, filed on Oct. 13, 2020, now Pat. No. 11,250,398, which is a
(Continued)

(51) Int. Cl.
*G06Q 20/10* (2012.01)
*G06Q 20/20* (2012.01)
*G06Q 40/03* (2023.01)

(52) U.S. Cl.
CPC ........... *G06Q 20/10* (2013.01); *G06Q 20/204* (2013.01); *G06Q 40/03* (2023.01)

(58) Field of Classification Search
None
See application file for complete search history.

(56) References Cited

U.S. PATENT DOCUMENTS

| 3,648,242 A | * | 3/1972 | Grosbard | ................ G06K 7/06 235/491 |
| 5,664,027 A | | 9/1997 | Ittner | |

(Continued)

FOREIGN PATENT DOCUMENTS

| CN | 1967565 A | 5/2007 |
| IN | 202141007247 A | 3/2021 |

(Continued)

OTHER PUBLICATIONS

Bieniecki, Wojciech et al. "Image Preprocessing for Improving OCR Accuracy", Computer Engineering Department, Technical University of Lodz, al. Politechniki 11, Lodz Poland, May 23, 2007.

(Continued)

*Primary Examiner* — Leland Marcus
(74) *Attorney, Agent, or Firm* — Crowell & Moring, L.L.P.

(57) ABSTRACT

An image of a negotiable instrument may be taken by a camera associated with a mobile device and provided from a user to a financial institution via the mobile device. The negotiable instrument may be deposited in a user's bank account based on the image. Any technique for sending the image to the financial institution may be used. The mobile device may process the image prior to sending the image to the financial institution. Additionally or alternatively, the financial institution may process the image.

18 Claims, 8 Drawing Sheets

Related U.S. Application Data continuation of application No. 16/376,166, filed on Apr. 5, 2019, now Pat. No. 10,839,358, which is a continuation of application No. 12/195,723, filed on Aug. 21, 2008, now Pat. No. 10,380,562.

(60) Provisional application No. 61/026,977, filed on Feb. 7, 2008.

(56) References Cited

U.S. PATENT DOCUMENTS

| | | | |
|---|---|---|---|
| 5,890,141 | A | 3/1999 | Carney et al. |
| 6,564,380 | B1 | 5/2003 | Murphy |
| 6,704,039 | B2 | 3/2004 | Pena |
| 6,726,097 | B2* | 4/2004 | Graef ................ G07D 11/30 235/379 |
| 6,738,087 | B2 | 5/2004 | Belkin et al. |
| 6,930,718 | B2 | 8/2005 | Parulski et al. |
| 7,004,382 | B2* | 2/2006 | Sandru ............... G06Q 20/042 235/382 |
| 7,296,734 | B2 | 11/2007 | Pliha |
| 7,480,382 | B2* | 1/2009 | Dunbar ............... G11B 27/309 |
| 7,568,615 | B2 | 8/2009 | Corona et al. |
| 7,647,897 | B2 | 1/2010 | Jones |
| 7,766,223 | B1 | 8/2010 | Mello |
| 7,865,425 | B2 | 1/2011 | Waelbroeck |
| 7,873,556 | B1 | 1/2011 | Dolan |
| 7,974,869 | B1 | 7/2011 | Sharma |
| 8,009,931 | B2 | 8/2011 | Li |
| 8,051,453 | B2 | 11/2011 | Arseneau et al. |
| 8,064,729 | B2 | 11/2011 | Li |
| 8,118,654 | B1 | 2/2012 | Nicolas |
| 8,131,636 | B1 | 3/2012 | Viera et al. |
| 8,275,715 | B2 | 9/2012 | Caruso |
| 8,396,623 | B2 | 3/2013 | Maeda et al. |
| RE44,274 | E | 6/2013 | Popadic et al. |
| 8,483,473 | B2 | 7/2013 | Roach |
| 8,725,607 | B2 | 5/2014 | Dunn |
| 8,768,836 | B1 | 7/2014 | Acharya |
| 8,824,772 | B2 | 9/2014 | Viera |
| 9,195,986 | B2 | 11/2015 | Christy et al. |
| 9,235,860 | B1 | 1/2016 | Boucher et al. |
| 9,387,813 | B1 | 7/2016 | Moeller et al. |
| 9,524,269 | B1 | 12/2016 | Brinkmann et al. |
| 9,674,396 | B1 | 6/2017 | Pashintsev |
| 9,818,090 | B1 | 11/2017 | Bueche, Jr. |
| 10,210,767 | B2 | 2/2019 | Johansen |
| 10,217,375 | B2 | 2/2019 | Waldron |
| 10,402,944 | B1 | 9/2019 | Pribble et al. |
| 10,460,295 | B1 | 10/2019 | Oakes, III et al. |
| 10,482,432 | B1 | 11/2019 | Oakes, III et al. |
| 10,846,667 | B1 | 11/2020 | Hecht |
| 11,121,989 | B1 | 9/2021 | Castinado |
| 11,182,753 | B1 | 11/2021 | Oakes, III et al. |
| 11,222,315 | B1 | 1/2022 | Prasad et al. |
| 11,232,517 | B1 | 1/2022 | Medina et al. |
| 11,250,398 | B1 | 2/2022 | Prasad et al. |
| 11,288,898 | B1 | 3/2022 | Moon |
| 11,328,267 | B1 | 5/2022 | Medina, III |
| 11,398,215 | B1 | 7/2022 | Clauer Salyers |
| 2001/0020949 | A1 | 9/2001 | Gong et al. |
| 2002/0075380 | A1 | 6/2002 | Seeger et al. |
| 2002/0152169 | A1 | 10/2002 | Dutta |
| 2003/0046223 | A1 | 3/2003 | Crawford |
| 2003/0056104 | A1 | 3/2003 | Carr |
| 2003/0081121 | A1 | 5/2003 | Swan |
| 2003/0119478 | A1 | 6/2003 | Nagy et al. |
| 2003/0158811 | A1 | 8/2003 | Sanders |
| 2003/0217005 | A1* | 11/2003 | Drummond ........... G07F 19/20 707/E17.107 |
| 2004/0136586 | A1 | 7/2004 | Okamura |
| 2004/0193878 | A1 | 9/2004 | Dillinger et al. |
| 2005/0001924 | A1 | 1/2005 | Honda |
| 2005/0078192 | A1 | 4/2005 | Sakurai |
| 2005/0087594 | A1 | 4/2005 | Phillips |
| 2005/0091117 | A1 | 4/2005 | Phillips |
| 2005/0091132 | A1 | 4/2005 | Phillips |
| 2005/0102208 | A1 | 5/2005 | Gudgeon |
| 2005/0125337 | A1 | 6/2005 | Tidwell |
| 2005/0128333 | A1 | 6/2005 | Park |
| 2005/0131820 | A1* | 6/2005 | Rodriguez ............. G06Q 40/12 705/30 |
| 2005/0133586 | A1 | 6/2005 | Rekeweg et al. |
| 2005/0165641 | A1 | 7/2005 | Chu |
| 2005/0190269 | A1 | 9/2005 | Grignani |
| 2005/0273430 | A1 | 12/2005 | Pliha |
| 2006/0010071 | A1 | 1/2006 | Jones |
| 2006/0023930 | A1 | 2/2006 | Patel |
| 2006/0026140 | A1 | 2/2006 | King et al. |
| 2006/0171697 | A1 | 2/2006 | Nijima |
| 2006/0045321 | A1 | 3/2006 | Yu |
| 2006/0124728 | A1 | 6/2006 | Kotovich et al. |
| 2006/0152576 | A1 | 7/2006 | Kiessling et al. |
| 2006/0202468 | A1 | 9/2006 | Phillips |
| 2006/0270421 | A1 | 11/2006 | Phillips |
| 2006/0280360 | A1 | 12/2006 | Holub |
| 2007/0058874 | A1 | 3/2007 | Tabata et al. |
| 2007/0095909 | A1 | 5/2007 | Chaum |
| 2007/0136078 | A1 | 6/2007 | Plante |
| 2007/0156438 | A1* | 7/2007 | Popadic ................ G06Q 40/00 229/71 |
| 2007/0244811 | A1 | 10/2007 | Tumminaro |
| 2008/0013831 | A1 | 1/2008 | Aoki |
| 2008/0040280 | A1 | 2/2008 | Davis |
| 2008/0086420 | A1* | 4/2008 | Gilder ................... G06Q 20/04 705/35 |
| 2008/0141117 | A1 | 6/2008 | King |
| 2008/0192129 | A1 | 8/2008 | Walker |
| 2008/0250196 | A1 | 10/2008 | Mori |
| 2008/0270295 | A1 | 10/2008 | Lent |
| 2009/0092287 | A1 | 4/2009 | Moraleda |
| 2009/0166406 | A1* | 7/2009 | Pigg ..................... G07F 19/211 235/379 |
| 2009/0171723 | A1 | 7/2009 | Jenkins |
| 2009/0176511 | A1 | 7/2009 | Morrison |
| 2009/0222347 | A1 | 9/2009 | Whitten |
| 2009/0236201 | A1 | 9/2009 | Blake |
| 2009/0240574 | A1 | 9/2009 | Carpenter |
| 2009/0242626 | A1 | 10/2009 | Jones |
| 2010/0038839 | A1 | 2/2010 | DeWitt et al. |
| 2010/0069093 | A1 | 3/2010 | Morrison |
| 2010/0069155 | A1 | 3/2010 | Schwartz |
| 2010/0076890 | A1 | 3/2010 | Low |
| 2010/0112975 | A1 | 5/2010 | Sennett |
| 2010/0150424 | A1 | 6/2010 | Nepomniachtchi et al. |
| 2010/0161408 | A1 | 6/2010 | Karson |
| 2010/0201711 | A1 | 8/2010 | Fillion et al. |
| 2010/0262607 | A1 | 10/2010 | Vassilvitskii |
| 2010/0287250 | A1 | 11/2010 | Carlson |
| 2011/0015963 | A1 | 1/2011 | Chafle |
| 2011/0016109 | A1 | 1/2011 | Vassilvitskii |
| 2011/0054780 | A1 | 3/2011 | Dhanani |
| 2011/0082747 | A1 | 4/2011 | Khan |
| 2011/0083101 | A1 | 4/2011 | Sharon |
| 2011/0105092 | A1 | 5/2011 | Felt |
| 2011/0112985 | A1 | 5/2011 | Kocmond |
| 2011/0166976 | A1 | 7/2011 | Krein |
| 2012/0036014 | A1 | 2/2012 | Sunkada |
| 2012/0052874 | A1 | 3/2012 | Kumar |
| 2012/0098705 | A1 | 4/2012 | Yost |
| 2012/0109793 | A1 | 5/2012 | Abeles |
| 2012/0113489 | A1 | 5/2012 | Heit et al. |
| 2012/0150767 | A1 | 6/2012 | Chacko |
| 2012/0230577 | A1 | 9/2012 | Calman et al. |
| 2012/0296768 | A1 | 11/2012 | Fremont-Smith |
| 2013/0021651 | A9 | 1/2013 | Popadic et al. |
| 2013/0097076 | A1 | 4/2013 | Love |
| 2013/0191261 | A1 | 7/2013 | Chandler |
| 2013/0324160 | A1 | 12/2013 | Sabatellil |
| 2013/0332004 | A1 | 12/2013 | Gompert et al. |
| 2013/0332219 | A1 | 12/2013 | Clark |
| 2013/0346306 | A1 | 12/2013 | Kopp |
| 2013/0346307 | A1 | 12/2013 | Kopp |
| 2014/0010467 | A1 | 1/2014 | Mochizuki et al. |

(56) References Cited

U.S. PATENT DOCUMENTS

| | | |
|---|---|---|
| 2014/0032406 A1 | 1/2014 | Roach et al. |
| 2014/0037183 A1 | 2/2014 | Gorski et al. |
| 2014/0156501 A1 | 6/2014 | Howe |
| 2014/0203508 A1 | 7/2014 | Pedde |
| 2014/0207673 A1 | 7/2014 | Jeffries |
| 2014/0207674 A1 | 7/2014 | Schroeder |
| 2014/0244476 A1 | 8/2014 | Shvarts |
| 2014/0313335 A1 | 10/2014 | Koravadi |
| 2014/0351137 A1 | 11/2014 | Chisholm |
| 2014/0374486 A1 | 12/2014 | Collins, Jr. |
| 2015/0134517 A1 | 5/2015 | Cosgray |
| 2015/0235484 A1 | 8/2015 | Kraeling et al. |
| 2015/0244994 A1 | 8/2015 | Jang et al. |
| 2015/0294523 A1 | 10/2015 | Smith |
| 2015/0348591 A1 | 12/2015 | Kaps et al. |
| 2016/0026866 A1 | 1/2016 | Sundaresan |
| 2016/0189500 A1 | 6/2016 | Kim et al. |
| 2017/0039637 A1 | 2/2017 | Wandelmer |
| 2017/0068421 A1 | 3/2017 | Carlson |
| 2017/0132583 A1 | 5/2017 | Nair |
| 2017/0229149 A1 | 8/2017 | Rothschild et al. |
| 2017/0263120 A1 | 9/2017 | Durie, Jr. et al. |
| 2018/0025251 A1 | 1/2018 | Welinder et al. |
| 2018/0108252 A1 | 4/2018 | Pividori |
| 2018/0197118 A1 | 7/2018 | McLaughlin |
| 2019/0026577 A1 | 1/2019 | Hall et al. |
| 2019/0122222 A1 | 4/2019 | Uechi |
| 2019/0311227 A1 | 10/2019 | Kriegman et al. |
| 2020/0311844 A1 | 10/2020 | Luo et al. |
| 2021/0097615 A1 | 4/2021 | Gunn, Jr. |

FOREIGN PATENT DOCUMENTS

| | | |
|---|---|---|
| JP | 2004-23158 | 1/2004 |
| JP | 3708807 | 10/2005 |
| JP | 2005326902 A | 11/2005 |

OTHER PUBLICATIONS

Shaikh, Aijaz Ahmed et al., "Auto Teller Machine (ATM) Fraud—Case Study of Commercial Bank in Pakistan", Department of Business Administration, Sukkur Institute of Business Administration, Sukkur, Pakistan, Aug. 5, 2012.

Bruno-Britz, Maria "Mitek Launches Mobile Phone Check Capture Solution," Bank Systems and Technologies Information Week (Jan. 24, 2008).

V User Guide, https://www.lg.com/us/support/manualsdocuments?customerModelCode=%20LGVX9800&csSalesCode=LGVX9800, select"VERISON(USA) en"; The V_UG_051125.pdf.

MING Phone User Manual, 2006.

Patel, Kunur, "How Mobile Technology is Changing Banking's Future" AdAge, Sep. 21, 2009, 4 pages.

Spencer, Harvey, "Controlling Image Quality at the Point of Capture" Check 21, Digital Check Corporation & HSA 2004.

Moseik, Celeste K., "Customer Adoption of Online Restaurant Services: A Multi-Channel Approach", Order No. 1444649 University of Delaware, 2007, Ann Arbor: ProQuest., Web. Jan. 10, 2022 (Year: 2007).

ANS X9.100-160-1-2004, Part 1: Placement and Location of Magnetic Ink Printing (MICR), American National Standard for Financial Services, approved Oct. 15, 2004.

Clancy, Heather, "Turning cellphones into scanners", The New York Times, Feb. 12, 2005; https://www.nytimes.com/2005/02/12/busienss/worldbusiness/turning-cellphones-into-scanners.html.

Consumer Guide to Check 21 and Substitute Checks, The Federal Reserve Board, The Wayback Machine—Oct. 28, 2004; https://web.archive.org/web/20041102233724/http://www.federalreserve.gov.

Curtin, Denis P., A Short Course in Digital Photography Chapter 7 Graphic File Formats.

Dance, Christopher, "Mobile Document Imaging", Xerox, Research Centre Europe, XRCE Image Processing Area, Nov. 2004.

Digital Photography Now, Nokia N73 Review, Oct. 28, 2006.

Federal Reserve System, 12 CFR Part 229, Availability of Funds and Collection of Checks, Board of Governors of the Federal Reserve System Final rule.

Financial Services Policy Committee, Federal Reserve Banks Plan Black-and-White Image Standard and Quality Checks, May 18, 2004.

MICR-Line Issues Associated With the Check 21 Act and the Board's Proposed Rule, Prepared by Federal Reserve Board Staff, Apr. 27, 2004.

Microsoft Computer Dictionary Fifth Edition—Copyright 2002.

HTTP Over TLS, Network Working Group, May 2000, Memo.

Nokia N73—Full phone specifications.

Ranjan, Amit, "Using a Camera with Windows Mobile 5", Jul. 21, 2006.

Reed, John, "FT.com site: Mobile users branch out", ProQuest, Trade Journal, Oct. 6, 2005.

Weiqui Luo et al., "Robust Detection of Region-Duplication Forgery in Digital Image" Guoping Qui, School of Computer Science, University of Nottingham, NG8 1BB, UK—Jan. 2006.

Final Written Decision relating to U.S. Pat. No. 8,699,779, IPR2021-01070, dated Jan. 19, 2023.

Final Written Decision relating to U.S. Pat. No. 8,977,571, IPR2021-01073, dated Jan. 19, 2023.

Final Written Decision relating to U.S. Pat. No. 10,621,559, IPR2021-01077, dated Jan. 20, 2023.

Tiwari, Rajnish et al., "Mobile Banking as Business Strategy", IEEE Xplore, Jul. 2006.

Lyn C. Thomas, "A survey of credit and behavioural scoring: forecasting financial risk of lending to consumers", International Journal of Forecasting, (Risk) (2000).

Non-Final Office Action issued on U.S. Appl. No. 14/293,159 dated Aug. 11, 2022 (14538-335).

Non-Final Office Action issued on U.S. Appl. No. 16/455,024 dated Sep 7, 2022 (14538-662).

Non-Final Office Action issued on U.S. Appl. No. 17/071,678 dated Sep. 14, 2022 (14538-705).

Non-Final Office Action issued on U.S. Appl. No. 17/180,075 dated Oct. 4, 2022 (14538-715).

Non-Final Office Action issue on U.S. Appl. No. 17/511,822 dated Sep. 16, 2022 (14538-731).

Non-Final Office Action issued on U.S. Appl. No. 17/568,849 dated Oct. 4, 2022 (14538-736).

Yong Gu Ji et al., "A Usability Checklist for the Usability Evaluation of Mobile Phone User Interface", International Journal of Human-Computer Interaction, 20(3), 207-231 (2006).

Printout of news article dated Feb. 13, 2008, announcing a Nokia phone providing audio cues for capturing a document image.

IPR Petition 2022-01593, *Truist Bank* v. *United Services Automobile Association* filed Oct. 11, 2022.

IPR2023-00829 filed Apr. 13, 2023, *Truist Bank* vs. *United Services Automobile Association*, 97 pages.

"Reserve Banks to Adopt DSTU X9.37-2003 Format for Check 21 Image Services," Fed. Reserve Bank of Minneapolis Fin. Serv. Policy Comm., May 18, 2004.

"Camera Phone Shoot-Out", Phone Scoop, Dec. 18, 2002.

Shirai, K. et al., "Removal of Background Patterns and Signatures for Magnetic Ink Character Recognition of Checks," 2012 $10^{th}$ IAPR International Workshop on Document Analysis Systems, Gold Coast, QLD. Australia, 2012, pp. 190-194.

Ding, Y. et al., "Background removal for check processing using morphology in Two-and Three-Dimensional Vision Systems for Inspection, Control, and Metrology". vol. 5606, pp. 19-26, SPIE 2004.

Haskell, B.G. et al., "Image and video coding-emerging standards and beyond," in IEEE Transactions on Circuits and Systems for Video Technology, vol. 8 No. 7, pp. 814-837, Nov. 1998.

Henkel, Joseph et al., "Remote Deposit Capture in the Consumer's Hands", Downloaded on Jun. 19, 2010 at 18:46: UTC from IEEE Xplore.

(56) References Cited

OTHER PUBLICATIONS

"Image Scanner having Image Quality diagnostics capability with No operator intervention", an IP.com Prior Art Database Technical Disclosure, Mar. 26, 2003.

* cited by examiner

SYSTEMS AND METHODS FOR MOBILE DEPOSIT OF NEGOTIABLE INSTRUMENTS

CROSS-REFERENCE TO RELATED APPLICATIONS

This application is a continuation of U.S. patent application Ser. No. 17/069,219 (still pending), filed Oct. 13, 2020, which is a continuation of U.S. patent application Ser. No. 16/376,166 (now U.S. Pat. No. 10,839,358), filed Apr. 5, 2019, which is a continuation of U.S. patent application Ser. No. 12/195,723 (now U.S. Pat. No. 10,380,562), filed Aug. 21, 2008, which claims the benefit of U.S. Provisional Patent Application No. 61/026,977, filed Feb. 7, 2008 and entitled "SYSTEMS AND METHODS FOR MOBILE DEPOSIT OF NEGOTIABLE INSTRUMENTS"; the entire disclosure of each of which are hereby incorporated by reference into the present disclosure. In addition this application is related by subject matter to that disclosed in the following commonly assigned applications, the entirety of which are hereby incorporated by reference herein: U.S. patent application Ser. No. 12/195,732 and U.S. patent application Ser. No. 12/195,745, each filed on Aug. 21, 2008 and each entitled "Systems And Methods For Mobile Deposit Of Negotiable Instruments."

BACKGROUND

Customers demand more of the products and services they use than ever before. They insist that the companies they deal with provide them greater levels of access and information. One of the methods of providing this increased information and access has been through the mobile telephone channel. Mobile services, enabled through slimmed down interfaces, have proliferated. Customers can receive alerts over a mobile channel, they can check the minutes left on their mobile voice plan, and through pre-set shorthand access numbers vote for their favorite contestant on a reality show.

Mobile banking is in its infancy. Customers have very limited access to their account information. One of the reasons for this limited access is a perceived lack of security over a mobile channel. In a bank branch, a person's identity can be visually verified. Over a web channel, they are required to authenticate themselves. However, on the mobile channel financial institutions are forced to operate through the Simple Message System (SMS) or through a very limited interface (both in screen resolution and in the throughput of the data channel) that provides little or no authentication facility.

SUMMARY

An image of a negotiable instrument may be taken by a camera associated with a mobile device and provided from a user to a financial institution via the mobile device. The negotiable instrument may be deposited in a user's bank account based on the image. Any technique for sending the image to the financial institution may be used.

In an implementation, the mobile device may process the image prior to sending the image to the financial institution. Additionally or alternatively, the financial institution may process the image.

In an implementation, processing the image may comprise one or more cleaning operations at the mobile device, the camera, and/or the financial institution. Cleaning operations may include at least one of the following for example: deskewing the image, dewarping the image, converting the resolution of the image to a predetermined resolution, converting the image from JPEG to TIFF, detecting information from the negotiable instrument, verifying non-duplicate presentment, and verifying signature.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

In the following detailed description of example embodiments, reference is made to the accompanying drawings, which form a part hereof and in which is shown, by way of illustration, specific embodiments in which the example methods, apparatuses, and systems may be practiced. It is to be understood that other embodiments may be used and structural changes may be made without departing from the scope of this description.

Figure 1:
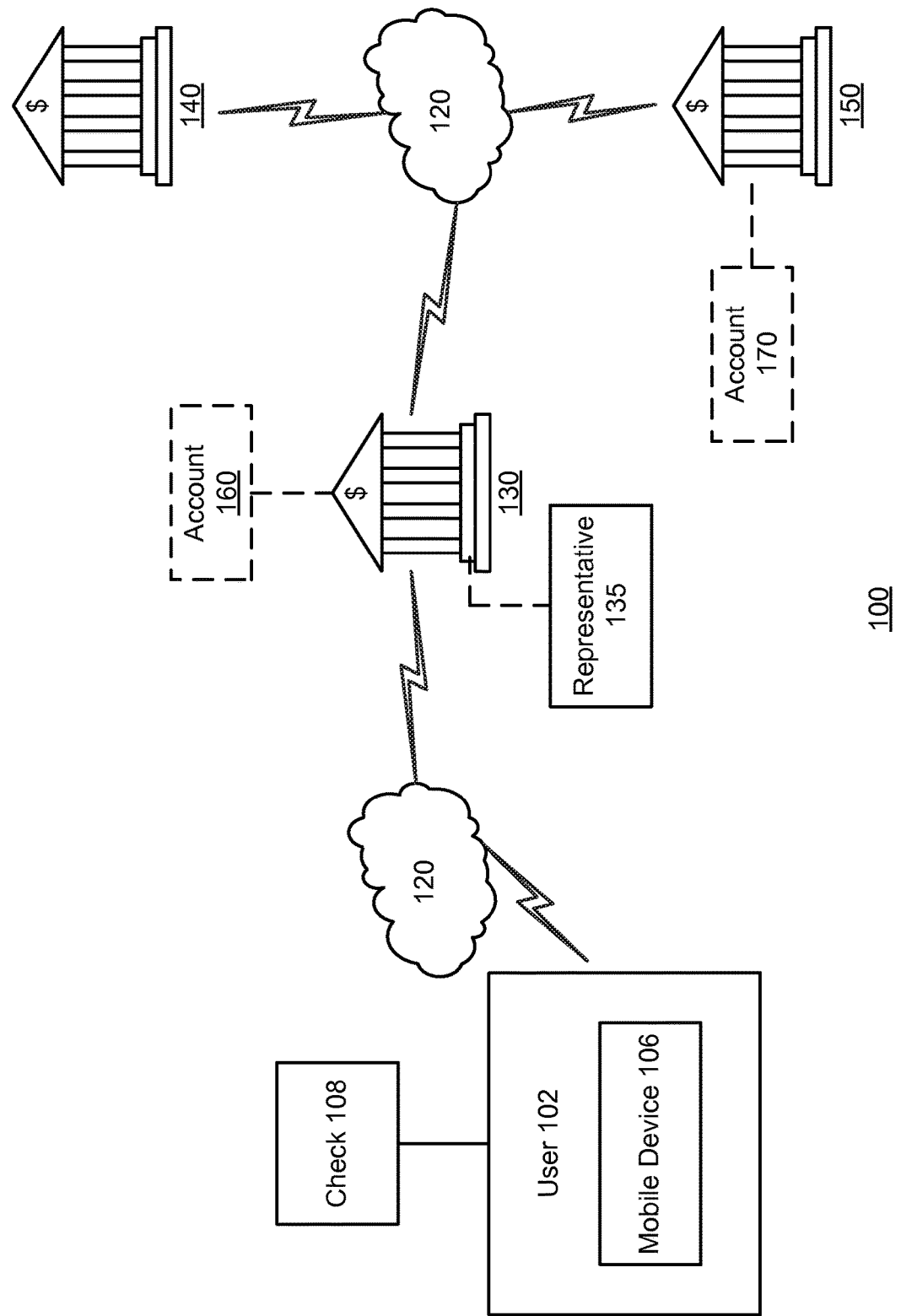
FIG. 1 is a block diagram of an implementation of a system in which example embodiments and aspects may be implemented.

FIG. 1 is a block diagram of an implementation of a system 100 in which example embodiments and aspects may be implemented. System 100 may include an account owner, referred to herein as a user 102, and financial institutions 130, 140, and 150, which may be any type of entity capable of processing a transaction involving a negotiable instrument. For example, financial institutions 130, 140, and 150 may be a retail bank, an investment bank, an investment company, a regional branch of the Federal Reserve, a clearinghouse bank and/or a correspondent bank.

A negotiable instrument typically includes a type of contract that obligates one party to pay a specified sum of money to another party. Negotiable instrument as used herein is an unconditioned writing that promises or orders payment of a fixed amount of money. One example of a negotiable instrument is a check. The check may be presented from a first person to a second person to affect the transfer of money from the first person to the second person. It may also include a check that is presented from a company or business to a person. In either case, the check may be taken by the receiving party and deposited into an account at a financial institution of the receiving party. This has required that the receiving party endorse the check and then present it for deposit at a bank branch. However, recent innovations have taken place that have enabled the receiving party to deposit the funds without visiting the bank branch, such as via automated teller machines (ATM). In addition to a check, negotiable instruments may include a draft, a bill of exchange, a promissory note, and the like.

The user 102 may be an individual who owns account 160 that may be held at financial institution 130. Account 160 may be any type of account for depositing funds, such as a savings account, a checking account, a brokerage account, and the like. The user 102 may communicate with financial institution 130 by way of communications network 120 such as an intranet, the Internet, a local area network (LAN), a wide area network (WAN), a public switched telephone network (PSTN), a cellular network, a voice over Internet protocol (VoIP) network, and the like. The user 102 may communicate with financial institution 130 by phone, email, instant messaging, facsimile, and the like. Financial institutions 130, 140, and 150 also may communicate with each other by way of communications network 120.

In an implementation, the user 102 may receive payment from another individual such as a payor in the form of a check 108 or other negotiable instrument that is drawn from account 170 at financial institution 150. The user 102 may endorse the check 108 (e.g., sign the back of the check 108) and indicate an account number on the check 108 for depositing the funds. It is noted that although examples described herein may refer to a check, the techniques and systems described herein are contemplated for, and may be used for, deposit of any negotiable instrument.

As described further herein, a digital image of a check or other negotiable instrument may be provided from a user to a financial institution, and the digital image may be processed and funds associated with the check or negotiable instrument in the digital image may be deposited in a user's bank account. The user 102 may deposit the check 108 into account 160 by making a digital image of the check 108 and sending the image file containing the digital image to financial institution 130. For example, after endorsing the check 108, the user 102 may use a mobile device 106 that comprises a camera to convert the check 108 into a digital image by taking a picture of the front and/or back of the check 108. The mobile device 106 may be a mobile phone (also known as a wireless phone or a cellular phone), a personal digital assistant (PDA), or any handheld computing device, for example.

In an implementation, the user 102 may send the digital image(s) to financial institution 130 using the mobile device 106. Any technique for sending a digital image to financial institution 130 may be used, such as providing a digital image to a website associated with financial institution 130 from storage, emailing a digital image to financial institution 130, or sending a digital image in a text message or instant message, for example.

Financial institution 130 may receive a digital image representing the check 108 and may use any known image processing software or other application(s) to obtain the relevant data of the check 108 from the digital image. Financial institution 130 may determine whether the financial information associated therewith may be valid. For example, financial institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image from the user 102.

The electronic devices may receive the digital image and may perform an initial analysis on the quality of the digital image, the readability of the data contained therein, or the like. For example, the electronic devices may determine whether the account number, amount payable, and the like may be readable such that it may be parsed or otherwise obtained and processed by the financial institution to credit an account 160 associated with the user 102 and debit an account associated with the payor. In an implementation, a representative 135 of financial institution 130 may provide assistance to the user 102 and may provide assistance in determining whether the financial information may be readable and/or of a good enough quality to be processed, as described further herein.

Upon receipt and approval of the digital image, financial institution 130 may credit the funds to account 160. Financial institution 130 may clear the check 108 by presenting a digital image of the check 108 captured from the digital image to an intermediary bank, such as a regional branch of the Federal Reserve, a correspondent bank and/or a clearinghouse bank. For example, the check 108 may be cleared by presenting the digital image to financial institution 140, which may be a regional branch of the Federal Reserve, along with a request for payment. Financial institutions 130 and 150 may have accounts at the regional branch of the Federal Reserve. Financial institution 130 may create a substitute check using the image provided by the user 102 and present the substitute check to financial institution 140 for further processing. Upon receiving the substitute check, financial institution 140 may identify financial institution 150 as the paying bank (e.g., the bank from which the check 108 is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check 108 may be cleared internally.

Figure 2:
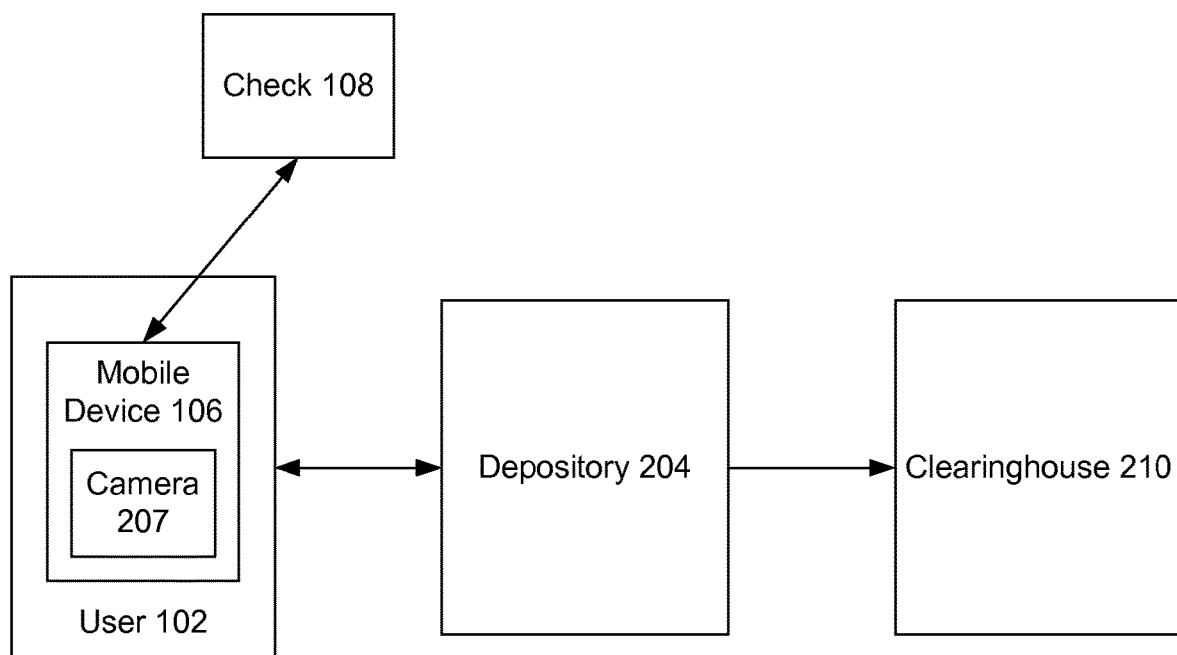
FIG. 2 shows a high-level block diagram of an implementation of a system that may be used for the deposit of a negotiable instrument.

FIG. 2 shows a high-level block diagram of an implementation of a system 200 that may be used for the deposit of a negotiable instrument. As described further herein, the user 102 may deposit the funds of the negotiable instrument using the camera functionality in the mobile device 106. In the example of one person giving a check to another person, this would enable the receiving party to deposit the funds at that time, without physically visiting an ATM or a bank branch.

In an implementation, the system 200 may include the user 102 and a depository 204. The mobile device 106 may comprise a camera 207, such as a digital camera. Such a mobile device may be called a camera phone. The mobile device 106, through the camera 207, has the ability to take or capture a picture or digital image of the check 108 or other negotiable instrument.

In an implementation, the camera 207 may take an image of the front of the check 108. Alternatively, the camera 207 may take an image of both the front and the back of the check 108. The back of the check may provide endorsement verification, such as the signature of the person or party the check is made out to. This may also include stamps, such as checks received at a merchant.

The depository 204 may include a bank in which the user 102 has a deposit account; however, the present disclosure is not limited to just banks. Alternatively, a third party may act as the depository 204 providing functionality to a plurality of users without regard to the bank at which they have deposit accounts, or whether their individual bank allows for the methods and systems described herein.

The depository 204, in an implementation, after receiving the image(s) of the check 108 from the user 102, may use a clearinghouse 210 to perform the check clearing operations. As described with respect to the system 100 of FIG. 1, check clearing operations are used by banks to do the final settlement of the check 108, such as removing funds from the account of the payor and transferring those funds to the user's bank. The user's bank may choose to make the funds available to the user 102 immediately and take on the risk that the check 108 does not clear. However, for various reasons, the bank may only make those funds available to the user 102 after the check 108 finally clears.

Figure 3:
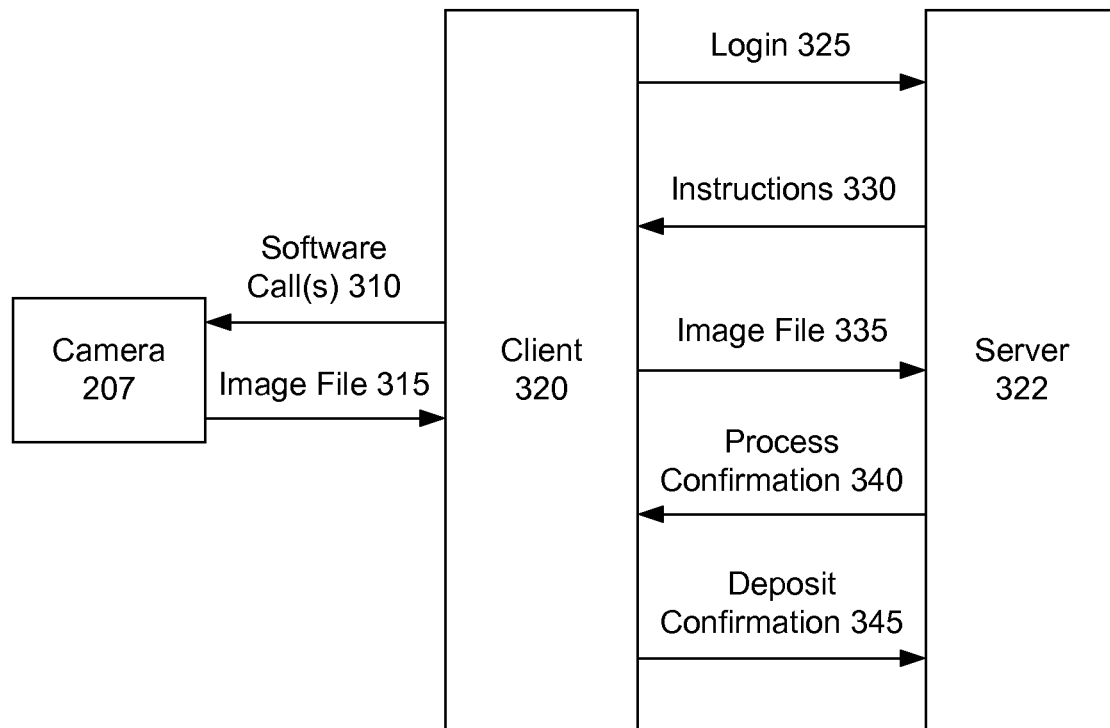
FIG. 3 shows a data-flow diagram of a system for the deposit of a negotiable instrument, in accordance with an example embodiment.

FIG. 3 shows a data-flow diagram of a system 300 for the deposit of a negotiable instrument, in accordance with an example embodiment. In the data-flow diagram of FIG. 3, a client 320 is one example of the mobile device 106 of the user 102 described with respect to the systems 100 and 200 of FIGS. 1 and 2, respectively. In an implementation, a server 322 may be a software component operable by the depository 204 of FIG. 2.

The client 320 may log in to a remote deposit system executed on the server 322. The login 325 may serve to authenticate the user 102 as an authorized consumer of the depository 204.

The server 322, in one example, may send instructions 330 to the client 320 that execute an application on the client 320. This may include instructions that cause a software object, which may have been previously downloaded and installed on the client 320, to be executed on the client 320.

In another example, the instructions 330 may include a wholly self-contained application that when delivered to the client 320 will execute and perform one or more operations described herein. In either example, the software object may be configured to make one or more software calls 310 to a digital camera, such as the camera 207 associated with the mobile device 106. This may be through specific software instructions to the camera. In other words, the camera's functionality may not be abstracted through any software library. In such an example, software code may be written and delivered to every different camera-equipped mobile phone.

In an alternate example, the software object may operate through a software abstraction layer, such as an application programming interface (API). The software object developer may only insert code into the software object to call one or more APIs exposed by the software operating the mobile device. One example of such software is Windows Mobile by Microsoft Corporation. In the context of a Windows Mobile device, the Windows Mobile operating system (OS) has one or more APIs exposed to application developers that will translate instructions from applications into instructions operable by the camera 207 on the mobile device 106. A mobile operating system, also known as a mobile platform or a handheld operating system, is the operating system that controls a mobile device. Other mobiles OSs include Symbian OS, iPhone OS, Palm OS, BlackBerry OS, and Android.

The software object may cause the camera 207 to take a picture or capture one or more images of the check 108 being deposited. These images may be captured sequentially, e.g., pursuant to the user 102 flipping the check 108 over after an image of the front of the check 108 has been captured. However, each side of the check 108 may be captured by the camera 207 using similar API calls. The images may be stored in an image file 315.

Once the images of one or both sides of the check 108 are captured by the camera 207, the image file 315 may be operated on by the software object of the client 320. These operations may include any of the following: deskewing, dewarping, magnetic ink character recognition (MICR), cropping (either automatically, or having the user 102 manually identify the corners and/or edges of the check 108 for example), reducing the resolution of the image, number detection, character recognition, and the like.

With respect to number and character recognition, commercial check scanners have used characteristics of the MICR encoding to detect information about the check, such as the bank's routing number and the account number. However, the characteristics that these scanners have used are the magnetic characteristic of the ink itself and these scanners have used methods similar to those of magnetic audio tape readers. In an implementation, a software object of the client 320 may optically recognize the characters on the MICR line, as a consumer mobile device such as the mobile device 106 will lack the magnetic reading ability of a commercial check scanner.

The image may be also down converted into a grayscale or black and white image, such as either in Joint Photographic Experts Group (JPEG) compliant format or in tabbed image file format (TIFF) for example. In an alternate example, the image may be formatted as a Scalable Vector Graphics (SVG) image. One of the benefits of an SVG file is a large size advantage over JPEG. In the former example, the image at some point before entry into the clearing system may be converted to TIFF format. This may be performed at the mobile device 106, wherein the camera 207 captures the image in TIFF format. However, the camera 207 of the mobile device 106 may capture the image in JPEG format, which may then be converted into TIFF either at the mobile device 106 or at the server 322. In the latter example, this may use the transmission of the TIFF image across a communications network which may be more advantageous as TIFF images are typically smaller in file size for the same size of picture as a JPEG formatted image.

The software object on the client 320 may operate by performing one or more of the operations described herein and then transmitting an image file 335 (e.g., based on image file 315 that has been processed) to the server 322 after the user 102 confirms that they do wish to deposit the check 108. Alternately, the software object may capture the image of the check 108 and transmit that image to the server 322 that in turn may perform those operations, verifies that the image quality is within acceptable thresholds, and communicates that verification back to the client 320, which can then instruct the user 102 to take a picture of the other side of the check 108. In this example, the image transmitted to the server 322 may be in any format, such as JPEG or TIFF, insofar as the server software has the ability to convert that image into a Check 21 compliant format. Alternately, the bank may output an X9.37 file to the clearing system. The Check Clearing for the 21st Century Act (or Check 21 Act) is a United States federal law that allows the recipient of a paper check to create a digital version, thereby eliminating the need for further handling of the physical document. The Check 21 standard for electronic exchange is defined in the standard DSTU X9.37-2003 ("X9.37"). It is a binary interchange format.

The server 322 may confirm (e.g., using a process confirmation 340) with the user 102 the transmission, reception, and processing of each side of the check 108 separately, or may confirm both sides at the same time. On the server side, more operations may be performed, such as signature verification. Where to perform these operations may be determined by the processing power of the mobile device 106 itself, which is typically limited in computational power. However, the present discussion is not limited in any way by discussion of where certain operations are described as operating. The operations of detecting and verifying information may be performed by the client 320 before the information is transmitted along with the image in the image file 335 to the server 322. Alternately, the software object operating on the mobile device 106 may perform no operation other then capturing images of the front and back of the check 108, receiving confirmation that the user 102 wishes to proceed, and transmitting those images to the server 322, wherein the server 322 performs those operations.

In an implementation, after the image file 335 has been received by the server 322, the server 322 may send a process confirmation 340 to the client 320. The process confirmation 340 may request instructions from the client 320 to continue proceeding with the deposit now that the server 322 has received the image file 335. In response, the client 320 may send a deposit confirmation 345 to the server 322, instructing the server 322 to process the deposit of the check based on the image file 335 that had been received by the server 322.

Figure 4:
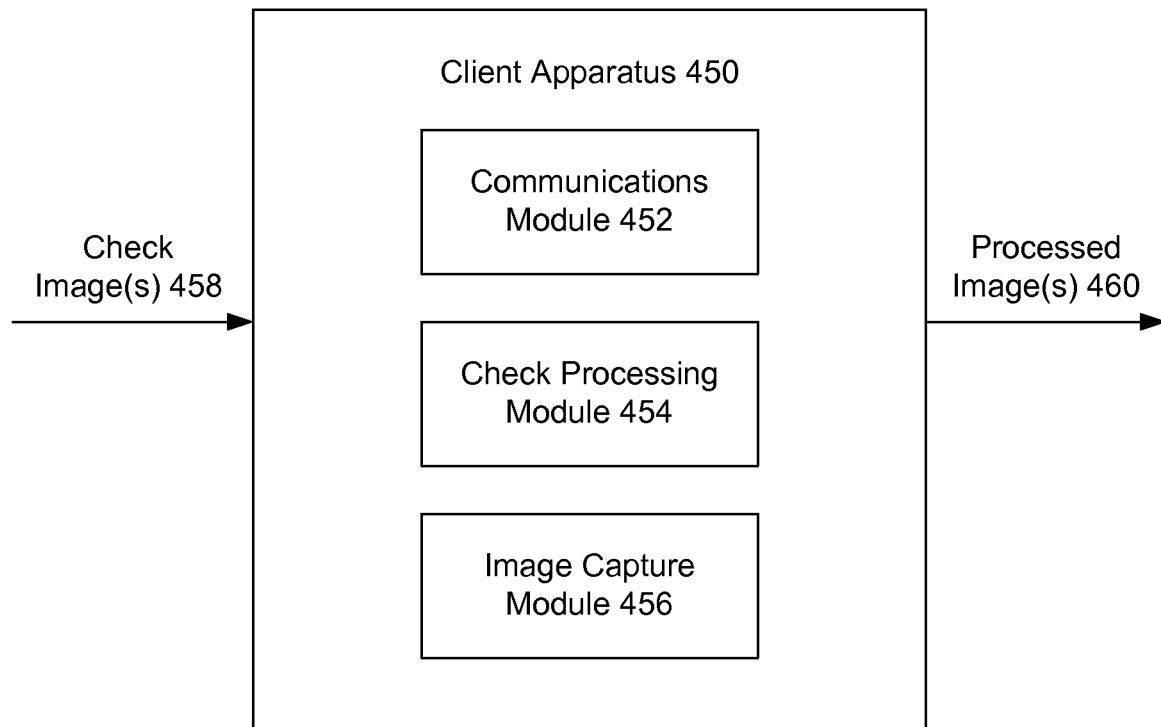
FIG. 4 shows a block diagram of a client apparatus for the deposit of a negotiable instrument, in accordance with an example embodiment.

FIG. 4 shows a block diagram of a client apparatus 450 for the deposit of a negotiable instrument, in accordance with an example embodiment. The client apparatus 450 may include one or more software objects operating on a mobile device 106, such as described above. The client apparatus 450 may include a communications module 452, a check processing module 454, and an image capture module 456. The client apparatus 450 may receive, in one example, one or more check images 458 as an input and output one or more processed images 460.

In an implementation, the check images 458 may be received following a software call from the check processing module 454 to the image capture module 456. In such an implementation, the image capture module 456 may include the camera 207 contained within the mobile device 106. Alternately, the camera 207 may be detachably coupled to the mobile device 106 such as through a secure digital (SD) slot or over any suitable communications bus, such as USB (universal serial bus).

Figure 5:
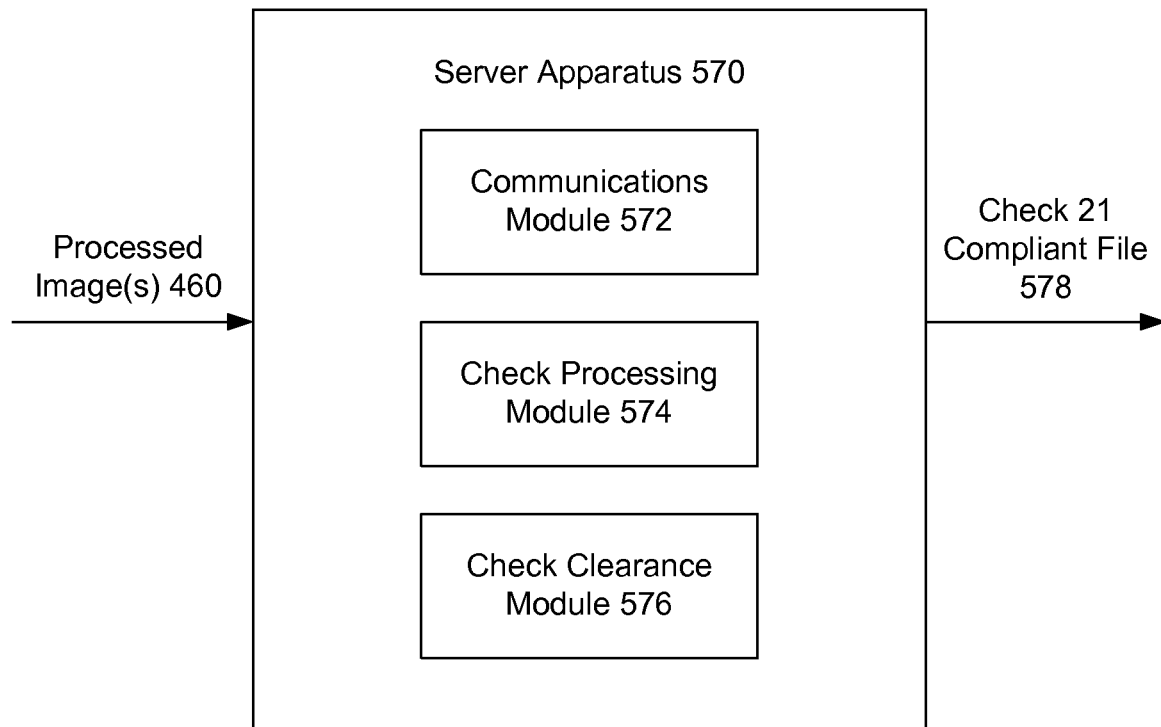
FIG. 5 shows a block diagram of a server apparatus for the deposit of a negotiable instrument, in accordance with an example embodiment.

In an implementation, the image capture module 456 may retrieve previously captured and stored image files (e.g., in local, remote, or removable storage associated with the client apparatus 450) and send the image files to a financial institution (e.g., financial institution 130, the server 322, the server apparatus 570 of FIG. 5, etc.) for processing.

In an implementation, the client apparatus 450 may comprise a browser such as a web browser, for accessing a website on the Internet or other network associated with a financial institution. The user may access the website and select a "capture image" link or similar icon, button or link, for example, displayed on the browser. Such a selection may call the image capture module 456 on the client apparatus 450.

The communications module 452 may be configured, in one example, to receive and send data signals over a suitable communications network. This may include, without limitation, GSM/GPR3, HSDPA, CDMA, TDMA, 802.11, 802.16 and the like. While the bandwidth available to the mobile device 106 may be an implementation concern such discussion is outside the scope of the present discussion and any suitable wireless communications network is considered to be within the scope of the present discussion. With respect to the present discussion, the communications module 452 may receive one or more processed check images 460 from the check processing module 454 and may transmit them over the suitable communications network to the depository 204, as described herein.

The check processing module 454 may be configured, in one example, to cause the image capture module 456 to capture a digital image of at least one side of a check. The check processing module 454 may then perform one or more cleaning operations on the image of the check. These cleaning operations, at a high level, are intended to ensure that the image of the check is suitable for one or more processing tasks. For instance, if the check is rotated 45 degrees clockwise when captured, the check processing module 454 or a software object operated on the server 322 described above may be unable to optically detect information on the check. In this example, the check processing module 454 may deskew the image such that the image was no longer rotated.

Another aspect of an image that may be cleaned is a warping of the image. Warping, as used herein, is meant to denote that the check is tilted forward or back with respect to a plane that is perpendicular to a line drawn from the camera lens to the center of the check. Warping, or tilting, of the image may also lead to incorrect optical detection of the check. In an implementation, the check processing module 454 may dewarp the check image such that, in a three-dimensional space, the check would appear to be perpendicular to an imaginary line drawn from the center of the camera lens to the center of the check itself.

The check processing module 454, in further examples, may perform one or more other cleaning or processing operations. This may include down-converting the image received from the image capture module to a suitable size, such as 200 dots per inch (DPI) resolution or in a resolution range such as 200 DPI to 400 DPI, 300 DPI to 500 DPI, etc., and/or converting the image to grayscale or black and white. Such operation(s) may reduce the file size of the check image.

Alternatively, the check processing module 454 may send instructions to the image capture module 456 to cause the image capture module 456 to capture an image of the check at a suitable resolution. The check processing module 454 may additionally perform any of the following operations, in further examples: convert from JPEG to TIFF, detect check information, perform signature detection on the image of the check, and the like. The check processing module 454 may, alternatively, send the captured check image to the server described herein for such processing, and receive confirmation that the operations were completed before further operations can proceed.

One of the issues with check processing is to detect the presence of a check against whatever background is present. While a user may be instructed to place the check on a dark or black background, such instructions may not provide a positive user experience. Alternatively or additionally, edge detection may be used to detect the check. Edge detection techniques have been described in other articles and any suitable method may be used herein. Alternative or additional methodology for check detection may use tile-cropping to detect and process the check.

As discussed above, the size of the file sent between the mobile device and the server may be small. This runs counter with respect to automatic check detection against a background. If captured in color, the contrast between check and background becomes easier. However, the processed image sent over the communications network may need to be smaller, and if the detection operation is performed by the server, it may be advantageous to convert the captured image to grayscale, or even black and white, before transmission to the server. Grayscale images are compliant with the Check 21 Act.

While "flat" is a fairly well known term to users, each user's appreciation of flat with respect to the camera lens of the camera 207 associated with the mobile device 106 may result in a problem with needing to align the check image programmatically or risk rejecting a large number of check images. As the image captured is a set of pixels, a tilted image will result in a jagged polygon rather then a perfect rectangle. Using convex hull algorithms, the check processing modules may create a smooth polygon around the boundary and remove the concavity of the check image. Alternatively, a rotating calipers algorithm may be used to determine the tightest fitting rectangle around the check boundary, which can then be used to determine the angle of it, with that angle being used to align the check properly.

The operator of the camera 207 may introduce distortions in the image due to a perspective problem, specifically an angling of the camera vertically over the check, and the top of the check is smaller then the bottom, or the reverse. A warping transformation algorithm (e.g., which may be exposed as a software call within Java advanced imaging) may be used to remove this distortion.

If user involvement is tolerated, the user may be queried to supply or identify three of the four corners of the check. In such an operation, the fourth corner may be derived, showing the perimeter of the check. This may allow a software object described herein to use less computational resources in processing the image of the check.

FIG. 5 shows a block diagram of a server apparatus 570 for the deposit of a negotiable instrument, in accordance with an example embodiment. The server apparatus 570 may include one or more software objects operating on a server operated by the depository 204 described above with respect to FIG. 2. The server apparatus 570 may include a communications module 572, a check processing module 574, and a check clearance module 576. The server apparatus 570 may receive one or more processed images 460 from a mobile device 106 or a client apparatus 450 as an input and may output a file such as a Check 21 compliant file 578. The Check 21 compliant file 578 may be a file or entry in a record set that is compliant with the clearinghouse rules set forth in the Check 21 Act and may include outputting an X9.37 file, in one example.

The communications module 572 may be configured to receive a wireless communication from the mobile device 106 over any suitable communications network, such as those described above. The communications module 572 may additionally receive a communication over a different communications network than the mobile device 106 communicated on, such as receiving the communication over a TCP/IP (Transmission Control Protocol/Internet Protocol) connection from the user's communication provider.

The check processing module 574 may be configured, in one example, to perform one or more check processing operations on the processed image(s) 460 that are received. In an implementation, these operations may include any of the operations described herein with respect to the check processing module 454 of FIG. 4. The operation of signature verification may be performed by the check processing module 574 of the server apparatus 570 as the server apparatus 570 may interface with other systems of the depository 204 that may maintain previously verified signature samples of the user 102. Performing signature verification at the client apparatus 450 may be computationally unfeasible; additionally, there may be a security risk if the signature sample is stored on the user's own device.

A cropped grayscale image may be sent to the server apparatus 570. The server apparatus 570 may perform further processing to remove distortion such as warping. The server apparatus 570 may extract information via a TIFF conversion and determine the DPI and re-scale to the proper DPI (e.g., convert to TIFF and detect the DPI that was used in the grayscale image). In an implementation, DPI detection may run on the client apparatus 450.

The check clearance module 576 may be configured, in one example, to receive a file from the check processing module 574 and may communicate with a check clearinghouse such that a Check 21 compliant file may be delivered to the check clearinghouse and funds may be received by the depository 204. The availability of the funds to the user 102 may be delayed by this operation such that the user 102 only has access to those funds when the depository 204 receives confirmation that the check has cleared.

Figure 6:
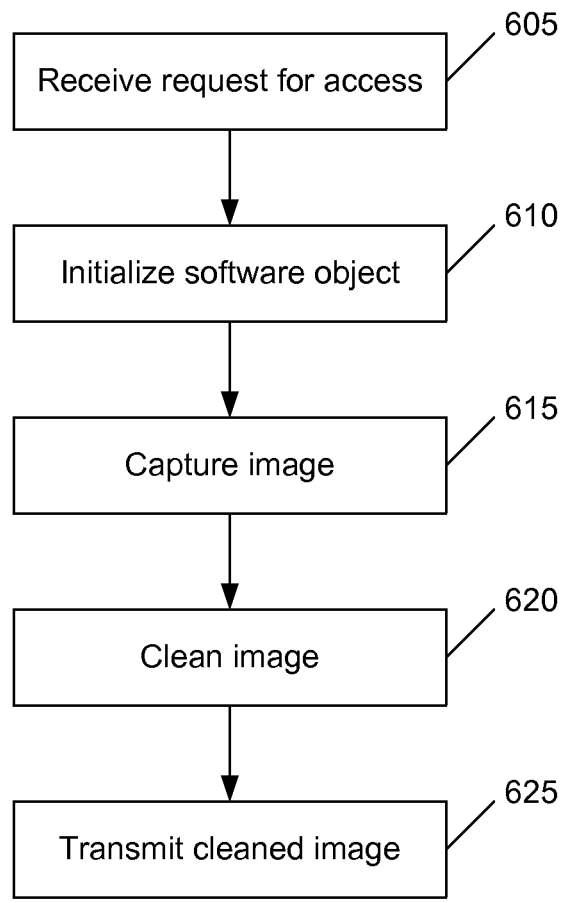
FIG. 6 is an operational flow of an implementation of a method that may be used for deposit of a negotiable instrument.

FIG. 6 is an operational flow of an implementation of a method 600 that may be used for deposit of a negotiable instrument. At 605, a request for access may be received from a user. The user may request access to a deposit system operated by a depository as described above by way of a mobile device, such a cellular phone, a PDA, a handheld computing device, etc. operated by the user. The access may be through some sort of user login, in some examples. The deposit system may be configured to receive a deposit of a negotiable instrument, such as a check, money order, cashier's check, etc. from the user and clear the negotiable instrument in a suitable clearinghouse system.

At 610, the system may initialize a software object on the mobile device. This may include sending instructions to the mobile device intended to execute a previously installed software object. Alternatively, the system may send a software object to the mobile device that may execute the software object, carry out operations described herein by use of the software object, and terminate the software object. In an implementation, the system may instruct a camera associated with the mobile device to capture an image of the negotiable instrument.

At 615, an image of the check may be captured. This may be accomplished through the software object accessing a camera associated with the mobile device (e.g., either comprised within the mobile device or separate from the mobile device). This may be done through an API exposed by the OS of the mobile device, or may be through software code customized for a specific phone and specific camera. With respect to the former, a developer of the software object may write code to the camera API(s), which may be specific to the OS and without regard to the camera on the device.

At 620, the image may be cleaned. Cleaning may include converting the image from JPEG format to TIFF format. Other cleaning operations are described herein. Cleaning operations may also be augmented by detecting operations. The operations at 620 may be carried out on the mobile device, in an implementation, though may include sending the image to the server apparatus, which may perform one or more cleaning operations and when complete may send a notification back to the mobile device of the completion. In either instance, the image may be deskewed, dewarped, and cropped for example, at block 620. Additionally, detection operations may be performed, e.g. after the cleaning operations are performed. The detection operations may include any of the following: optically read the MICR line, courtesy amount recognition (CAR), legal amount recognition (LAR), signature block, and payee. As discussed above, the detecting operations may be performed by the client, the server, or some combination thereof.

At 625, the cleaned image may be transmitted to the depository. This may include transmitting the cleaned image alone to the depository, but may also include transmitting the detected information on the check to the depository.

Figure 7:
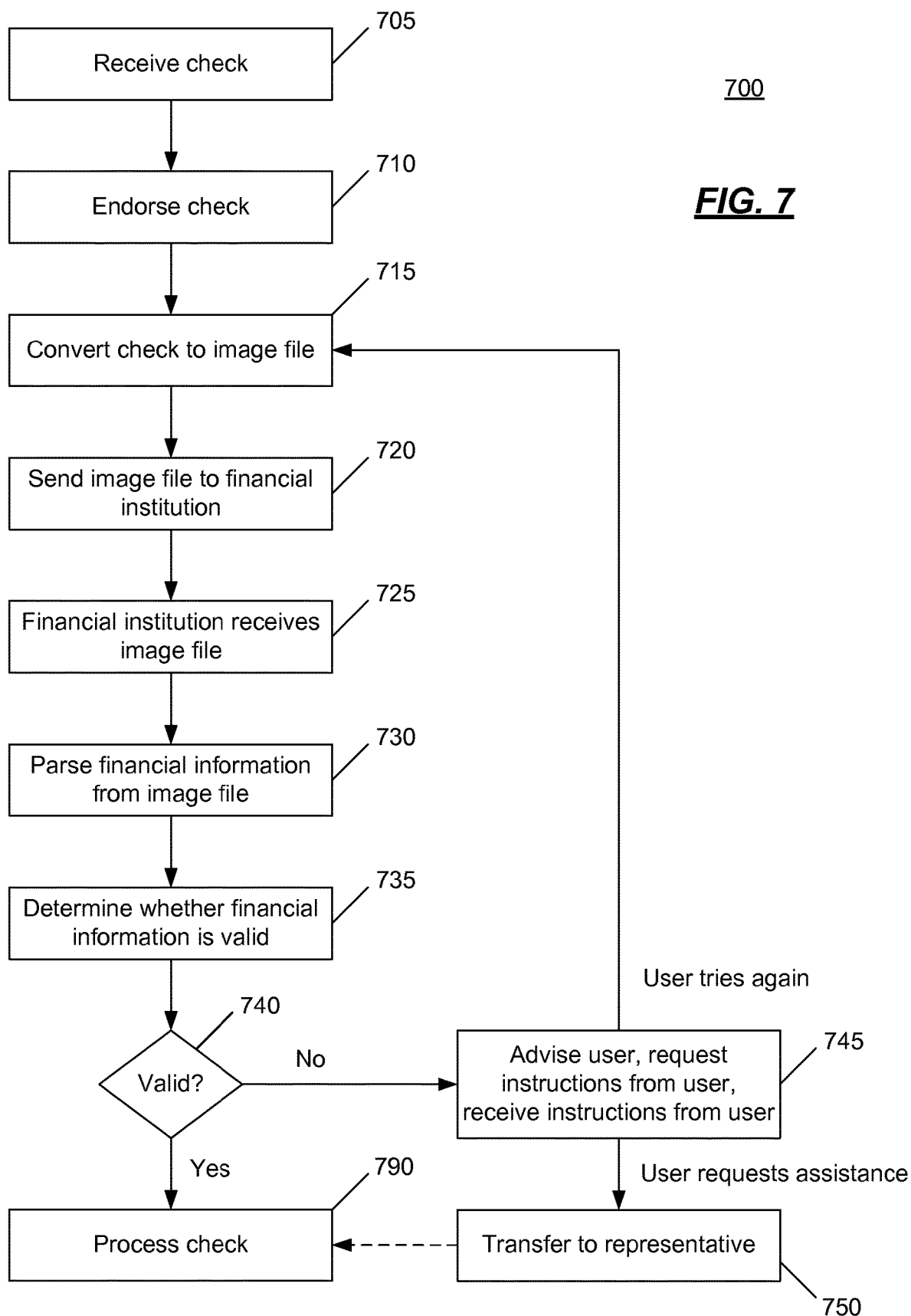
FIG. 7 is an operational flow of another implementation of a method that may be used for deposit of a negotiable instrument.

FIG. 7 is an operational flow of another implementation of a method 700 that may be used for deposit of a negotiable instrument. At 705, a user (e.g., an account owner, payee, etc.) may receive a check from a third party (i.e., a payor). At 710, the user may endorse the check by signing the back of the check in the designated field. If the user wishes to deposit the check into an account, such as a savings and/or checking account, they also may write an account number below the signature.

At 715, the user may convert the check into an image file that comprises electronic data representing an image of the check. For example, the user may create an image file comprising an image of the first side of the check, the second side of the check, or both. In an implementation, the image file may be created using a digital camera. The digital camera may be comprised within mobile device or may be separate from the mobile device and detachably connectable to the mobile device.

At 720, the user may transmit the image file to a financial institution, such as a bank, that may be associated with an account for depositing funds. For example, the user may send the image file of the check to the financial institution by attaching the image file to an email. Alternatively, the image file may be sent using various means, including, but not limited to, an Internet connection via a website of the financial institution or a wireless cellular transmission. In an implementation, the image file may be sent to the financial institution via streaming.

Additionally, the image file may be augmented by secondary data, which may be information relating to the check, such as an account number, a deposit amount, or a routing number associated with the check, and/or relating to the account for depositing funds, such as the account number and/or the name on the account. The account number may appear on the check itself, below the signature endorsing the check. The account number and/or name on the account also may appear in an email, either with or without the image file, for example. The user may send the image file and the secondary data to the financial institution, using any technique, along with a request to deposit the check into a particular user account.

At 725, the financial institution may receive the image file pertaining to the check along with financial information pertaining to the account for depositing funds and any secondary data. In an implementation, the financial institution may determine that there are multiple user accounts in which to deposit the check. The accounts may be the same type of account, such as a checking account, or different types of accounts, such as checking, savings, or investment accounts. The user may make a selection among a list of accounts in which to deposit the check. The selection may be transmitted to the financial institution, which may process the deposit request according to the image file, the secondary data, and the selected account.

At 730, the financial institution may open the image file and parse financial information from the image file. The image file may be processed using any known technology to retrieve financial information regarding the check. Example technologies that may be used by the financial institution may include image editing, filtering to remove imagery except the check in the received image, image sharpening, and technologies to distinguish between the front and the back sides of the check.

At 735, after retrieving the financial information from the check in an electronic data representation form, the financial institution may determine whether the financial information such as the amount payable to the user, the account associated with the user to deposit funds, an account associated with a payor to debit funds, and a financial institution associated with the payor and/or the user may be valid. For example, the financial institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the financial institution to credit an account associated with the user and debit an account associated with the payor.

At 740, if the financial information is determined to be valid, the electronic data representation may be processed by the financial institution at 790, thereby depositing the check in the user's account. If the financial information is determined to be invalid at 740, then the user may be advised at 745. For example, the financial institution may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the image deposit again (e.g., make another image file using the camera and send it to the financial institution) or whether the user would like assistance from a representative, for example. The user may indicate how they would like to proceed. If the user would like to try the image deposit again, processing may continue at 715 in an implementation.

If the user would like assistance, the financial information may be transferred to a representative for further review at 750. The representative, such as a customer service representative, a bank teller who may be located at a branch, a virtual bank teller who may be located remotely via an electronic device, or the like, may review the financial information associated with the electronic data representation to determine whether to allow the electronic data representation to be processed by the financial institution. For example, the initial analysis may require a certain quality requirement, a certain readability requirement, or the like, thus, leading to a high failure rate even though the electronic data representation may otherwise be valid. Thus, the representative may review the electronic data representation to determine whether the financial information may be readable and/or of a good enough quality to be processed. If so, the electronic data representation of the financial information may be processed by the financial institution at 790, thereby depositing the check in the user's account.

The user may receive a notice via email, facsimile, instant message, or mail, for example, that the check has been deposited into the selected account. In an implementation, if the check is not successfully deposited by image deposit, the financial institution may provide additional options to the user on how to redeem the check, such as mailing the check to the financial institution or the like.

In an implementation, the financial institution may receive a decision from a representative on whether to credit the funds to an account. For example, a representative such as a virtual or remote teller may make a decision such as to approve or deny processing of the electronic data representation. According to an embodiment, a virtual teller may fill in the invalid financial information. For example, the virtual teller may issue a decision to approve the electronic data representation and may fill in the financial information deemed invalid from the initial analysis based upon inspection or review by the teller. The financial institution may then receive the invalid information from the virtual bank teller such that the electronic data representation may be processed.

In an implementation, at 790, the financial institution may process the electronic data representation of the check. For example, the financial institution may credit the funds to an account associated with the individual if, based on the decision received from the representative, the financial information may be approved. Additionally, the financial institution may credit the funds to an account associated with the user if, based on the determination, the financial information may be valid. The credit may be a provisional credit, enabling the user to access the funds while the check is being cleared. A provisional credit may be voided if the bank determines that the transaction is erroneous and/or fraudulent. Additionally, to credit funds to the account, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN).

The ACH service provider may process the debit entry by identifying the account and bank from which the check may be drawn. The bank from which the check is drawn (i.e., the payor's bank) may be referred to as a receiving depository financial institution. If the payor's bank verifies the transaction, the ACH service provider may settle the transaction by debiting the payor's bank and crediting the user's bank. The payor's bank may then debit the payor's account.

Accordingly, a user, without regard to physical location, may access a system described herein, take images of a check, deposit that check into their account and have the funds immediately available (depending on the depository's clearance policies). The user would not have to wait for the mail to pick up their check, the check to get to the bank, the bank to deposit the check, and then have the funds available. The implementations described herein may be limited by the risk tolerance of the depository. If the depository is concerned with fraudulent presentment of the checks through these systems, they may restrict access to particular level of user, such as an "elite" level user. Though the term check has been used as representative of a negotiable instrument, the present discussion is not limited to checks and encompasses any negotiable instrument that a user may present to a depository.

Figure 8:
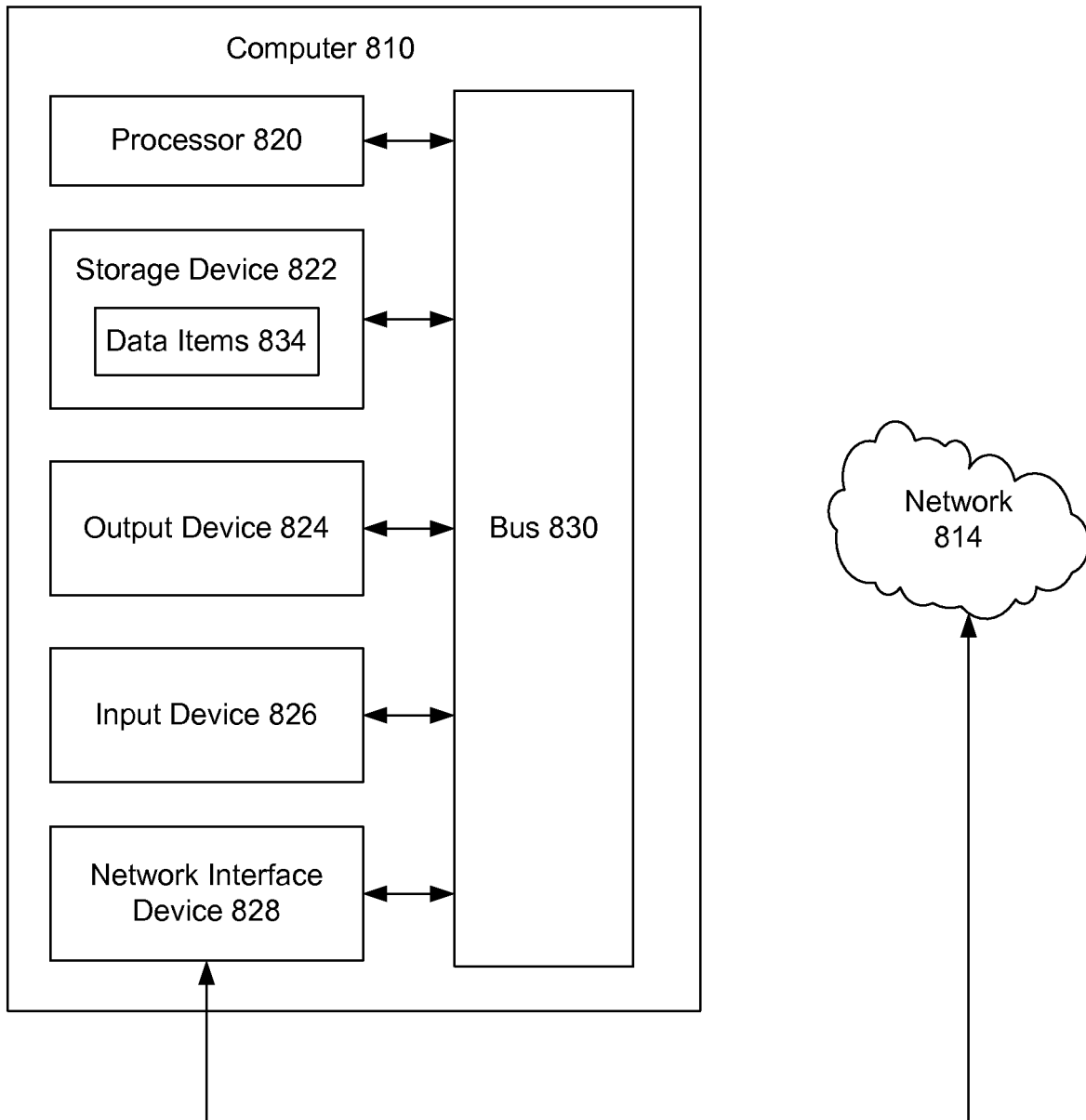
FIG. 8 is a block diagram of an example computing environment in which example embodiments and aspects may be implemented.

FIG. 8 is a block diagram of an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, a system 800 includes a computer 810 connected to a network 814. The computer 810 includes a processor 820, a storage device 822, an output device 824, an input device 826, and a network interface device 828, all connected via a bus 830. The processor 820 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 820 executes instructions and includes that portion of the computer 810 that controls the operation of the entire computer. Although not depicted in FIG. 8, the processor 820 typically includes a control unit that organizes data and program storage in memory and transfers data and other information between the various parts of the computer 810. The processor 820 receives input data from the input device 826 and the network 814 reads and stores code and data in the storage device 822 and presents data to the output device 824.

Although the computer 810 is shown to contain only a single processor 820 and a single bus 830, the disclosed embodiment applies equally to computers that may have multiple processors and to computers that may have multiple busses with some or all performing different functions in different ways.

The storage device 822 represents one or more mechanisms for storing data. For example, the storage device 822 may include read-only memory (ROM), RAM, magnetic disk storage media, optical storage media, flash memory devices, and/or other machine-readable media. In other embodiments, any appropriate type of storage device may be used. Although only one storage device 822 is shown, multiple storage devices and multiple types of storage devices may be present. Further, although the computer 810 is drawn to contain the storage device 822, it may be distributed across other computers, for example on a server.

The storage device 822 includes a controller (not shown in FIG. 8) and data items 834. The controller includes instructions capable of being executed on the processor 820 to carry out the functions as previously described herein with reference to FIGS. 1-7. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 822 may also contain additional software and data (not shown), which is not necessary to understand the invention. Although the controller and the data items 834 are shown to be within the storage device 822 in the computer 810, some or all of them may be distributed across other systems, for example on a server and accessed via the network 814.

The output device 824 is that part of the computer 810 that displays output to the user. The output device 824 may be a liquid crystal display (LCD) well-known in the art of computer hardware. In other embodiments, the output device 824 may be replaced with a gas or plasma-based flat-panel display or a traditional cathode-ray tube (CRT) display. In still other embodiments, any appropriate display device may be used. Although only one output device 824 is shown, in other embodiments any number of output devices of different types, or of the same type, may be present. In an embodiment, the output device 824 displays a user interface.

The input device 826 may be a keyboard, mouse or other pointing device, trackball, touchpad, touch screen, keypad, microphone, voice recognition device, or any other appropriate mechanism for the user to input data to the computer 810 and manipulate the user interface previously discussed. Although only one input device 826 is shown, in another embodiment any number and type of input devices may be present.

The network interface device 828 provides connectivity from the computer 810 to the network 814 through any suitable communications protocol. The network interface device 828 sends and receives data items from the network 814.

The bus 830 may represent one or more busses, e.g., USB, PCI, ISA (Industry Standard Architecture), X-Bus, EISA (Extended Industry Standard Architecture), or any other appropriate bus and/or bridge (also called a bus controller).

The computer 810 may be implemented using any suitable hardware and/or software, such as a personal computer or other electronic computing device. Portable computers, laptop or notebook computers, PDAs, pocket computers, appliances, telephones, and mainframe computers are examples of other possible configurations of the computer 810. For example, other peripheral devices such as audio adapters or chip programming devices, such as EPROM (Erasable Programmable Read-Only Memory) programming devices may be used in addition to, or in place of, the hardware already depicted.

The network 814 may be any suitable network and may support any appropriate protocol suitable for communication to the computer 810. In an embodiment, the network 814 may support wireless communications. In another embodiment, the network 814 may support hard-wired communications, such as a telephone line or cable. In another embodiment, the network 814 may support the Ethernet IEEE (Institute of Electrical and Electronics Engineers) 802.3x specification. In another embodiment, the network 814 may be the Internet and may support IP (Internet Protocol). In another embodiment, the network 814 may be a LAN or a WAN. In another embodiment, the network 814 may be a hotspot service provider network. In another embodiment, the network 814 may be an intranet. In another embodiment, the network 814 may be a GPRS (General Packet Radio Service) network. In another embodiment, the network 814 may be any appropriate cellular data network or cell-based radio network technology. In another embodiment, the network 814 may be an IEEE 802.11 wireless network. In still another embodiment, the network 814 may be any suitable network or combination of networks. Although one network 814 is shown, in other embodiments any number of networks (of the same or different types) may be present.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A processor-implemented method of depositing a negotiable instrument, comprising:
   with a processor of a server of a financial institution in communication with a mobile device, the mobile device communicatively coupled to an imaging device, the processor:
      authenticating a user of the mobile device, the authenticating of the user, comprising:
         receiving, from the mobile device, authentication information of the user of the mobile device that authenticates the user to a server of the financial institution; and
         authenticating, based on the authentication information, that the user is an authorized consumer of the financial institution;
      instructing an application on the mobile device, after the authenticating of the user, to enable execution of a remote deposit processing component on the mobile device;
      receiving, from the remote deposit processing component, confirmation from the user that the user wishes to proceed with depositing the negotiable instrument;
      performing a cleaning procedure via the remote deposit processing component on an image of the negotiable instrument taken by the imaging device communicatively coupled to the mobile device of the user, the cleaning procedure including at least one of deskewing or dewarping the image of the negotiable instrument;
      receiving, from the remote deposit processing component, an image file of the negotiable instrument after the cleaning procedure; and
      depositing funds of the negotiable instrument into an account based on financial information within the image of the negotiable instrument.

2. The method of claim 1, wherein the processor further performs acts of:
   verifying that the image file is readable such that the financial information may be obtained from the negotiable instrument.

3. The method of claim 1, wherein the image file is received via an Internet connection or a wireless cellular transmission.

4. The method of claim 1, wherein:
   the image of the negotiable instrument comprises a first side of the negotiable instrument, and
   the image file further comprises a second image comprising a second side of the negotiable instrument.

5. The method of claim 1, wherein the processor further performs acts of:
   determining whether the financial information is invalid, and if so, transferring the financial information to a representative.

6. The method of claim 1, further comprising determining whether the financial information is invalid, and if so,
   advising the user;
   receiving a second image file from the user;
   obtaining second financial information pertaining to the negotiable instrument from the second image file; and
   depositing funds of the negotiable instrument into an account based on the second financial information pertaining to the negotiable instrument.

7. A computer-readable medium comprising:
   computer-readable instructions for depositing a negotiable instrument, said computer-readable instructions comprising instructions that, when executed by a processor of a server of a financial institution, cause the processor to:
      authenticate a user of a mobile device, where to authenticate the user, the processor is configured to:
         receive, from the mobile device, authentication information of the user of the mobile device that authenticates the user to a server of the financial institution; and
         authenticate, using the authentication information, that the user is an authorized consumer of the financial institution;
      instruct an application on the mobile device, after the authentication of the user, to enable execution of a remote deposit processing component on the mobile device;
      receive confirmation from the user that the user wishes to proceed with depositing the negotiable instrument;
      perform a cleaning procedure via the remote deposit processing component on an image of the negotiable instrument taken by an imaging device communicatively coupled to the mobile device of the user, the cleaning procedure including at least one of deskewing or dewarping the image of the negotiable instrument;
      receive, from the remote deposit processing component, an image file of the negotiable instrument after the cleaning procedure; and
      deposit funds of the negotiable instrument into an account based on financial information within the image of the negotiable instrument.

8. The computer-readable medium of claim 7, wherein the computer-readable instructions further cause the processor to:
   verify that the image file is readable such that financial information may be obtained from the negotiable instrument; and
   obtain the financial information pertaining to the negotiable instrument from the image file, wherein the financial information includes information regarding an account for depositing funds of the user.

9. The computer-readable medium of claim 7, wherein the image file is received via an Internet connection or a wireless cellular transmission.

10. The computer-readable medium of claim 7, wherein:
    the image of the negotiable instrument comprises a first side of the negotiable instrument, and
    the image file further comprises a second image comprising a second side of the negotiable instrument.

11. The computer-readable medium of claim 7, further comprising instructions that determine whether the financial information is invalid, and if so, transfer the financial information to a representative.

12. The computer-readable medium of claim 7, further comprising instructions that determine whether the financial information is invalid, and if so,
   advise the user;
   receive a second image file from the user;
   obtain second financial information pertaining to the negotiable instrument from the second image file; and
   deposit funds of the negotiable instrument into an account based on the second financial information pertaining to the negotiable instrument.

13. A system for depositing a negotiable instrument, comprising:
   a server of a financial institution, the server comprising:
   a memory storing instructions;
   a processor disposed in communication with said memory, the processor configured to execute the instructions to:
      authenticating a user of a mobile device, the authenticating of the user, comprising:
         receive, from the mobile device, authentication information of the user of the mobile device that authenticates the user to the server of the financial institution; and
         authenticate, using the authentication information, that the user is an authorized consumer of the financial institution;
      instruct an application on the mobile device, after the authenticating of the user, to enable execution of a remote deposit processing component on the mobile device;
      receive confirmation from the user that the user wishes to proceed with depositing the negotiable instrument;
      perform a cleaning procedure via the remote deposit processing component on an image of the negotiable instrument taken by an imaging device communicatively coupled to the mobile device of the user, the cleaning procedure including at least one of deskewing or dewarping the image of the negotiable instrument;
      receiving, from the remote deposit processing component, an image file of the negotiable instrument after the cleaning procedure; and
      depositing funds of the negotiable instrument into an account based on financial information within the image of the negotiable instrument.

14. The system of claim 13, wherein the processor is further configured to:
   verify that the image file is readable such that financial information may be obtained from the negotiable instrument.

15. The system of claim 13, wherein the image file is received via an Internet connection or a wireless cellular transmission.

16. The system of claim 13, wherein:
   the image of the negotiable instrument comprises a first side of the negotiable instrument, and
   the image file further comprises a second image comprising a second side of the negotiable instrument.

17. The system of claim 13, further comprising at least one subsystem that determines whether the financial information is invalid, and if so, transfers the financial information to a representative.

18. The system of claim 13, further comprising at least one subsystem that determines whether the financial information is invalid, and if so,
   advises the user;
   receives a second image file from the user;
   obtains second financial information pertaining to the negotiable instrument from the second image file; and
   deposits funds of the negotiable instrument into an account based on the second financial information pertaining to the negotiable instrument.

* * * * *